US012551480B2

(12) United States Patent
Vonderscher et al.

(10) Patent No.: US 12,551,480 B2
(45) Date of Patent: *Feb. 17, 2026

(54) TREATMENT USING EYP001

(71) Applicant: ENYO PHARMA, Lyons (FR)

(72) Inventors: Jacky Vonderscher, Senouillac (FR); Elise Roy, Les Fins (FR); Raphaël Darteil, Lyons (FR); Pietro Scalfaro, Fiesch (CH)

(73) Assignee: ENYO PHARMA, Lyons (FR)

( * ) Notice: Subject to any disclaimer, the term of this patent is extended or adjusted under 35 U.S.C. 154(b) by 974 days.

This patent is subject to a terminal disclaimer.

(21) Appl. No.: 17/627,704

(22) PCT Filed: Jul. 17, 2020

(86) PCT No.: PCT/EP2020/070239
§ 371 (c)(1),
(2) Date: Jan. 17, 2022

(87) PCT Pub. No.: WO2021/009331
PCT Pub. Date: Jan. 21, 2021

(65) Prior Publication Data
US 2022/0249469 A1 Aug. 11, 2022

(30) Foreign Application Priority Data
Jul. 18, 2019 (EP) .................................. 19186947

(51) Int. Cl.
| A61K 31/496 | (2006.01) |
| A61K 38/21 | (2006.01) |
| A61P 1/16 | (2006.01) |
| A61P 3/00 | (2006.01) |
| A61P 9/00 | (2006.01) |
| A61P 31/20 | (2006.01) |

(52) U.S. Cl.
CPC .......... *A61K 31/496* (2013.01); *A61K 38/212* (2013.01); *A61P 1/16* (2018.01); *A61P 3/00* (2018.01); *A61P 9/00* (2018.01); *A61P 31/20* (2018.01)

(58) Field of Classification Search
CPC ........... A61K 31/496; A61P 1/16; A61P 31/20
See application file for complete search history.

(56) References Cited

U.S. PATENT DOCUMENTS

| 7,576,068 B2* | 8/2009 | Averett ................. A61P 1/16 514/47 |
| 9,895,380 B2* | 2/2018 | Andre ................ A61K 31/7072 |
| 2022/0241376 A1 | 8/2022 | Vonderscher et al. |
| 2022/0313690 A1 | 10/2022 | Vonderscher et al. |

FOREIGN PATENT DOCUMENTS

| WO | WO 2018/051229 | 3/2018 |
| WO | WO 2018/126016 | 7/2018 |
| WO | WO 2018/222910 | 12/2018 |
| WO | WO 2019/023245 | 1/2019 |
| WO | WO 2021/009332 | 1/2021 |
| WO | WO 2021/009333 | 1/2021 |

OTHER PUBLICATIONS

Claudel, T. et al. "Role of nuclear receptors for bile acid metabolism, bile secretion, cholestasis, and gallstone disease" *Biochimica et Biophysica Acta*, 2011 (available online Dec. 29, 2010), pp. 867-878, vol. 1812, No. 8.
Erken, R. et al. "FRI-286: First clinical evaluation in chronic hepatitis B patients of the synthetic farnesoid X receptor agonist EYP001" *Journal of Hepatology*, 2018, S488-S489, vol. 68.
Joly, S. et al. "A Phase 1, Open-Label, Randomized, 4-Way Crossover Study in Subjects With Chronic Hepatitis B Virus Infection to Assess Pharmacokinetics (Fasted/Fed), Safety, Tolerability and Pharmacodynamics of Single Oral Doses of Farnesoid X Receptor Agonist EYP001a" Mar. 2, 2018, retrieved from the Internet: URL:https://ichgcp.net/clinical-trials-registry/NCT03320616 [retrieved on Sep. 25, 2018], pp. 1-8.
Joly, S. et al. "SAT-158: The selective FXR agonist EYP001 is well tolerated in healthy subjects and has additive anti-HBV effect with nucleoside analogues in HepaRG cells" *Journal of Hepatology*, 2017, p. S690, vol. 66.
Rizzetto, L. et al. "Connecting the immune system, systemic chronic inflammation and the gut microbiome: The role of sex" *Journal of Autoimmunity*, 2018, pp. 12-34, vol. 92.
Written Opinion in International Application No. PCT/EP2020/070239, Sep. 17, 2020, pp. 1-11.
Gege, C. et al. "Nonsteroidal FXR Ligands: Current Status and Clinical Applications" *Handbook of Experimental Pharmacology*, 2019, pp. 1-39.
Anonymous, "A Phase 2a, Randomized, Double-Blind, Multicenter, Placebo-Controlled Study to Assess the Safety, Tolerability, Pharmacokinetics, and Efficacy of EYP001a in Patients With Non-alcoholic Steatohepatitis", ClinicalTrials.gov ID NCT03812029, retrieved from the internet: URL: https://clinicaltrials.gov/study/NCT03812029?term=EYP001&rank=4&tab=history&a=2#version-content-panel, Feb. 15, 2019, pp. 1-29.

\* cited by examiner

*Primary Examiner* — Kevin E Weddington
(74) *Attorney, Agent, or Firm* — SALIWANCHIK, LLOYD & EISENSCHENK

(57) ABSTRACT

The present invention relates to a method of treatment with an FXR agonist allowing to decrease pruritus and improve efficacy.

13 Claims, 2 Drawing Sheets

TREATMENT USING EYP001

CROSS-REFERENCE TO RELATED APPLICATION

This application is the U.S. national stage application of International Patent Application No. PCT/EP2020/070239, filed Jul. 17, 2020.

FIELD OF THE INVENTION

The present invention relates to the field of the medicine, especially a treatment with EYP001.

BACKGROUND OF THE INVENTION

Pruritus is a symptom found in patients with chronic liver diseases, especially cholestatic liver diseases such as primary biliary cholangitis. This symptom impairs patient quality of life by disturbing sleep and possibly daily life activities.

FXR agonists are currently developed for liver and metabolic diseases including cholestatic disorders such as primary biliary cirrhosis. However, unwanted effects could be associated with a treatment with an FXR agonist.

For example, obeticholic acid is FXR agonist which has been approved for treatment primary biliary cholangitis (also called OCALIVA®) and clinical trials for NASH (non-alcoholic steatohepatitis) were carried out. Obeticolic acid showed significant improvements in biochemical parameters, but increased pruritus rates, up to 51%. The high rates of pruritus could compromise the use of obeticholic acid for a chronic disease such as NASH. The incidence and severity of pruritus were reported to be independent of PBC disease stage, and the mechanism of FXR-induced pruritus remains unknown.

Mechanisms implicated in pruritus have been associated with the peripheral and central nervous systems, leading to the development of various therapeutic options. For instance, combinations of FXR agonists with other therapeutic drugs such as an acetyl-CoA carboxylase (ACC) inhibitor, NK-1 antagonist (WO2018/005695), CCR2 or CCR5 antagonist (WO2018/126016) or SAMe (WO2019/023245) have been proposed in order to decrease the adverse effects of FXR agonists, especially pruritus.

WO 2015/036442 discloses the interest of FXR agonist for decreasing HBV replication. EYP001 is a synthetic non-steroidal, non-bile acid FXR agonist with a good tolerability profile. EYP001 is an orally bioavailable small molecule currently evaluated in phase Ib in patients with chronic hepatitis B. Erken et al (2018, Journal of Hepatology, 68, Suppl 1, S488-S489) discloses the results of a first clinical evaluation in chronic hepatitis B patients. 11 patients received a single 300 mg dose of EYP001 in the morning or the evening, fed or unfed, each administration being separated by at least 48.5 hours (i.e., 2 days). Joly et al (2017, Journal of Hepatology, 66, Suppl 1, SAT-158) reports the results regarding the safely in healthy individuals of EYP001 and its effect alone or in combination with nucleosides analogues on hepatic cells infected with HBV. Single and multiple oral doses of EYP001 were tested (i.e., single doses of 30, 60, 120, 250, 500 or 800 mg, or multiple doses of 60, 120, 250 or 500 mg once daily during 15 days.

There is still a need for therapies that inhibit or decrease the adverse effects of FXR agonists (i.e., pruritus) while retaining therapeutic benefits of FXR agonists.

SUMMARY OF THE INVENTION

EYP001 is an FXR agonist and the inventors surprisingly identified a dosing regimen allowing a decrease in the frequency of the pruritus occurring during a treatment with EYP001. Indeed, for the same daily dose, fewer pruritus episodes are observed when EYP001 is administered once a day rather than twice a day. This result goes against what could be expected since it is known that the appearance of pruritus depends on the dose and maximum blood concentrations. In addition, an increased efficacy has also been observed in the treatment of NASH and chronic hepatitis B when EYP001 is administered once a day rather than twice a day.

Accordingly, the present invention relates to EYP001 or a pharmaceutical composition comprising it for use for the treatment of a disease in a patient suffering of the disease, wherein EYP001 is to be administered once a day. It also relates to the use of EYP001 or a pharmaceutical composition comprising it for the manufacture of a drug for the treatment of a disease in a patient suffering of the disease, wherein EYP001 is to be administered once a day. It further relates to a method for treating a disease in a subject suffering of the disease, comprising administering a therapeutically effective amount of EYP001 once a day, thereby decreasing the pruritus occurrence.

Preferably, the disease is selected from the group consisting of chronic liver disease, gastrointestinal disease, renal disease, cardiovascular disease, metabolic disease and infection disease. More particularly, the disease is selected from the group consisting of primary biliary cholangitis (PBC), cerebrotendinous xanthomatosis (CTX), primary sclerosing cholangitis (PSC), drug induced cholestasis, intrahepatic cholestasis of pregnancy, parenteral nutrition associated cholestasis (PNAC), bacterial overgrowth or sepsis associated cholestasis, autoimmune hepatitis, chronic viral hepatitis, alcoholic liver disease, nonalcoholic fatty liver disease (NAFLD), nonalcoholic steatohepatitis (NASH), alcoholic hepatitis, liver transplant associated graft versus host disease, living donor transplant liver regeneration, congenital hepatic fibrosis, choledocholithiasis, granulomatous liver disease, intra- or extrahepatic malignancy, Sjogren's syndrome, Sarcoidosis, Wilson's disease, Alagille syndrome, Gaucher's disease, hemochromatosis, biliary atresia, ductopenic liver transplant rejection, cystic fibrosis liver disease, alpha 1-antitrypsin deficiency, diabetic nephropathy, focal segmental glomerulosclerosis (FSGS), hypertensive nephrosclerosis, chronic glomerulonephritis, chronic transplant glomerulopathy, chronic interstitial nephritis, polycystic kidney disease, atherosclerosis, arteriosclerosis, dyslipidemia, hypercholesterolemia, hypertriglyceridemia, insulin resistance, Type I and Type II diabetes, obesity, hepatis B virus (HBV) infection and chronic hepatitis B. In a particular aspect, the disease is hepatitis B infection, especially chronic hepatitis B. In another particular aspect, the disease is hepatitis B infection, especially chronic hepatitis B.

In a particular aspect, the disease is hepatitis B infection, especially chronic hepatitis B, and EYP001 is to be used in combination with an immunomodulator. The immunomodulator can be selected from a TLR7, TLR8 or TLR9 agonist, A RIG-I modulator and a STING agonist. The immunomodulator can be an interferon, preferably IFN-α or a pegylated form thereof, more preferably IFN-α2a, IFN-α2b or a pegylated form thereof.

Preferably, EYP001 is to be administered at a dose in the range from 25 to 800 mg per day or 50 to 800 mg per day. More particularly, EYP001 is to be administered at a dose in the range from 100 to 600 mg per day; more preferably from 150 to 400 mg per day or from 200 to 400 mg per day.

In one aspect, EYP001 is to be administered for at least 3, 4, 5, 6, 7 or 8 weeks. Then, in this aspect, EYP001 is to be administered once a day at a dose in the range from 25 to 800 mg per day or 50 to 800 mg per day for at least 3, 4, 5, 6, 7 or 8 weeks.

In addition, the treatment regimen can also have a period in which EYP001 is to be administered once a day and, when pruritus occurs, the EYP001 administration is stopped for 1 to 7 days.

In one aspect, EYP001 is to be administered during a period of time of at least 5, 6, 7 or 8 weeks or 1, 2, 3, 4, 5 or 6 months, for instance from 5, 6, 7 or 8 weeks to 100 weeks, in particular from 12 weeks to 80 weeks, for instance 72 weeks.

DETAILED DESCRIPTION OF THE INVENTION

EYP001 is an FXR agonist disclosed in CAS number 1192171-69-9 and having the following formula:

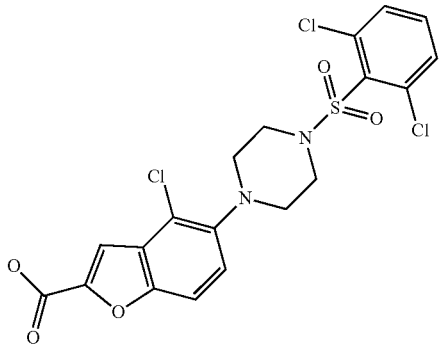 [SMILES: O=C(O)c1cc2c(Cl)c(N3CCN(S(=O)(=O)c4c(Cl)cccc4Cl)CC3)ccc2o1]

By EYP001 is intended to refer to this compound and any pharmaceutically acceptable salt thereof.

The inventors identified a dosing regimen allowing to reduce an adverse-effect which is often associated with FXR agonist treatment, the occurrence of pruritus. Indeed, a dosing regimen with one administration per day decreases the occurrence of pruritus compared with a dosing regimen with several administrations per day for a same daily dosing. This improvement is of importance when the disease needing a long-term treatment, especially in the context of a chronic disease. In addition, an increased efficacy has also been observed in the treatment of NASH and chronic hepatitis B when EYP001 is administered once a day rather than twice a day. It leads to a very significant improvement when you consider the benefit-risk ratio.

Therefore, the present invention relates to EYP001 or a pharmaceutical composition comprising it for use for the treatment of a disease in a patient suffering of the disease, wherein EYP001 is to be administered once a day. It also relates to the use of EYP001 or a pharmaceutical composition comprising it for the manufacture of a drug for the treatment of a disease in a patient suffering of the disease, wherein EYP001 is to be administered once a day. It further relates to a method for treating a disease in a subject suffering of the disease, comprising administering a therapeutically effective amount of EYP001 once a day, thereby decreasing the pruritus occurrence.

Definition

As used herein, the terms "treatment", "treat" or "treating" refer to any act intended to ameliorate the health status of patients such as therapy, prevention, prophylaxis and retardation of a disease. In certain embodiments, such terms refer to the amelioration or eradication of the disease, or symptoms associated with it. In other embodiments, this term refers to minimizing the spread or worsening of the disease, resulting from the administration of one or more therapeutic agents to a subject with such a disease.

As used herein, the terms "subject", "individual" or "patient" are interchangeable and refer to a human, including adult, child, newborn and human at the prenatal stage. In a particular aspect, the subject or patient suffers of a disease as specified below, in particular a chronic disease.

The terms "quantity," "amount," and "dose" are used interchangeably herein and may refer to an absolute quantification of a molecule.

As used herein, the term "therapeutic effect" refers to an effect induced by an active ingredient, or a pharmaceutical composition according to the invention, capable to prevent or to delay the appearance or development of a disease or disorder, or to cure or to attenuate the effects of a disease or disorder.

As used herein, the term "therapeutically effective amount" refers to a quantity of an active ingredient or of a pharmaceutical composition which prevents, removes or reduces the deleterious effects of the disease, particularly infectious disease. It is obvious that the quantity to be administered can be adapted by the man skilled in the art according to the subject to be treated, to the nature of the disease, etc. In particular, doses and regimen of administration may be function of the nature, of the stage and of the severity of the disease to be treated, as well as of the weight, the age and the global health of the subject to be treated, as well as of the judgment of the doctor.

As used herein, the term "excipient or pharmaceutically acceptable carrier" refers to any ingredient except active ingredients that is present in a pharmaceutical composition. Its addition may be aimed to confer a particular consistency or other physical or gustative properties to the final product. An excipient or pharmaceutically acceptable carrier must be devoid of any interaction, in particular chemical, with the active ingredients.

By decreasing the adverse effects, it is intended that the adverse effects are decreased in the frequency of occurrence in a treated patient or in the population of treated patients and/or the adverse effects are decreased in their intensity and/or the appearance/onset of the adverse effects is delayed. In particular, the decrease is of at least 10, 20, 30, 40 or 50% in comparison to the absence of treatment with EYP001. Optionally, the appearance/onset of the adverse effects is delayed by at least 1, 2 or 3 weeks or by at least 1, 2 or 3 months.

As used herein, the term "pegylated form" refers to a pegylated interferon.

Improved Dosing Regimen

As detailed above, EYP001 is administered once a day. Thereby, the occurrence of adverse effects, in particular of pruritus, is decreased.

In a first aspect, EYP001 is administered in the evening (e.g., 6 and 10 pm). In an alternative aspect, EYP001 is administered in the morning (e.g., between 6 and 10 am).

Optionally, EYP001 is administered with or without food. Then, in a first aspect, EYP001 is administered during the meal, e.g., just before, simultaneously or just after the meal.

In a second aspect, EYP001 is administered at least one hour or two hours before or after the meal.

Typically, EYP001 is administered to the subject with a therapeutically effective amount. It will be understood, however, that the total daily usage of EYP001 and compositions of the present invention will be decided by the attending physician within the scope of sound medical judgment. The specific therapeutically effective dose level for any particular patient will depend upon a variety of factors including the disorder being treated and the severity of the disorder; activity of the specific compound employed; the specific composition employed, the age, body weight, general health, sex and diet of the patient; the time of administration, route of administration, and rate of excretion of the specific compound employed; the duration of the treatment; drugs used in combination with EYP001; and like factors well known in the medical arts.

However, the daily dosage of EYP001 may be varied over a wide range from 25 to 1,000 mg per adult per day, from 50 to 1,000 mg per adult per day, from 25 to 800 mg per adult per day, from 50 to 800 mg per adult per day, from 50 to 600 mg per adult per day or from 100 to 600 mg per adult per day. Preferably, the daily dosage of EYP001 is in the range from 25 to 450 mg per day, from 50 to 450 mg per day, from 100 to 450 mg per day, from 150 to 450 mg per day, from 25 to 400 mg per day, from 50 to 400 mg per day, from 100 to 400 mg per day, from 150 to 400 mg per day, from 25 to 350 mg per day, from 50 to 350 mg per day, from 100 to 350 mg per day, from 150 to 350 mg per day, from 200 to 450 mg per day, from 200 to 400 mg per day, from 200 to 350 mg per day, from 250 to 450 mg per day, from 250 to 400 mg per day, or from 250 to 350 mg per day.

Preferably, the composition, dosage unit or dosage form contains 5, 10, 15, 25, 50, 75, 100, 200, 300, 400 and 500 mg of EYP001 for the symptomatic adjustment of the dosage to the patient to be treated. A medicament typically contains from about 50 mg to about 800 mg of EYP001, preferably from 50 mg to about 500 mg of EYP001, from 50 mg to about 450 mg of EYP001, from 100 mg to about 400 mg of EYP001, or from 150 mg to about 300 mg of EYP001.

In one aspect, the dosage form can be a scored dosage form. Alternatively, the daily dosage can be provided by administering several dosage forms.

The EYP001 may be combined with pharmaceutically acceptable excipients, and optionally sustained-release matrices, such as biodegradable polymers, to form pharmaceutical compositions.

"Pharmaceutically" or "pharmaceutically acceptable" refers to molecular entities and compositions that do not produce an adverse, allergic or other untoward reaction when administered to a mammal, especially a human, as appropriate. A pharmaceutically acceptable carrier or excipient refers to a non-toxic solid, semi-solid or liquid filler, diluent, encapsulating material or formulation auxiliary of any type.

The pharmaceutical compositions comprising EYP001 can be suitable for oral, sublingual, subcutaneous, intramuscular, intravenous, transdermal, local or rectal administration, preferably for oral administration.

The EYP001, alone or in combination with another active principle, can be administered in a unit administration form, as a mixture with conventional pharmaceutical supports. Suitable unit administration forms comprise oral-route forms such as tablets, gel capsules, powders, granules and oral suspensions or solutions, sublingual and buccal administration forms, aerosols, implants, subcutaneous, transdermal, topical, intraperitoneal, intramuscular, intravenous, subdermal, transdermal, intrathecal and intranasal administration forms and rectal administration forms.

In a preferred embodiment, the oral dosage form is a capsule or a tablet. Optionally, the oral dosage form is a scored dosage form. Optionally, the dosage form can be scored into four pieces, three pieces or two pieces.

Depending on the disease to treat, the treatment can last from 1 week to all life, preferably 3 weeks to one or several years. Then, EYP001 can be administered during one week up to several months or years, more specifically from 3, 4, 5, 6, 7 or 8 weeks to several months or years, preferably from 5, 6, 7 or 8 weeks to 100 weeks. In a particular aspect, EYP001 is administered during at least 5, 6, 7 or 8 weeks. For instance, EYP001 is administered during from 2-4 months up to 24 months. For instance, the treatment period can be 2, 3, 4, 5, 6, 7, 8, 9, 10, 11, 12, 13, 14, 15, 16, 17, 18, 19, 20, 21, 22, 23 or 24 months. In a very specific aspect, the treatment lasts from 12 to 100 weeks, from 12 to 80 weeks, from 45 to 100 weeks, from 45 to 80 weeks, for instance 72 weeks. For instance, the treatment may last from 12 to 52 weeks, preferably from 45 to 52 weeks, for instance 48 weeks.

The present invention also relates to improved treatment regimens. These treatments regimens all comprise a treatment period in which EYP001 is to be administered or is administered once a day for at least 1-7 days, optionally for 1-7 days, for instance 1, 2, 3, 4, 5, 6 or 7 days. Preferably, these treatments regimens all comprise a treatment period in which EYP001 is to be administered or is administered once a day for at least 3, 4, 5, 6, 7 or 8 weeks, optionally for 3-8 weeks, for instance 3, 4, 5, 6, 7 or 8 weeks.

The treatment period can be combined with other treatment periods, in particular depending on the occurrence of pruritus.

In a particular aspect, the treatment regimen has a period in which EYP001 is to be administered once a day and, when pruritus occurs, the EYP001 administration is stopped. For instance, the EYP001 administration can be stopped for a defined period of time, e.g., for at least 1 to 7 days, especially 1 to 7 days, e.g., 1, 2, 3, 4, 5, 6 or 7 days. After this period with EYP001 treatment, the treatment regimen can further comprise a second period of treatment in which EYP001 is administered once a day.

Diseases

The disease to be treated with EYP001 is an FXR mediated condition.

The FXR mediated condition can be selected from the group consisting of: a chronic intrahepatic or some form of extrahepatic cholestatic condition; liver fibrosis; an obstructive inflammatory disorder of the liver; chronic inflammatory disorder of the liver; liver cirrhosis; liver steatosis or an associated syndrome; cholestatic or fibrotic effects that are associated with alcohol-induced cirrhosis or with viralborne forms of hepatitis; liver failure or liver ischemia after major liver resection; chemotherapy associated steatohepatitis (CASH); acute liver failure; Inflammatory Bowel Disease; a lipid and lipoprotein disorder; Type I Diabetes; Type II Diabetes; clinical complications of Type I and Type II Diabetes selected from the group consisting of diabetic nephropathy, diabetic neuropathy, diabetic retinopathy and other observed effects of clinically manifest long term Diabetes; Non-Alcoholic Fatty Liver Disease (NAFLD); Non-Alcoholic Steatohepatitis (NASH); obesity; a metabolic syndrome selected from the group consisting of combined conditions of dyslipidemia, diabetes and abnormally high body-mass index; acute myocardial infarction; acute stroke; and thrombosis which occurs as an endpoint of chronic obstructive atherosclerosis; a non-malignant hyperproliferative disorder; and a malignant hyperproliferative disorder selected from the group consisting of hepatocellular carcinoma, colon adenoma, and polyposis; colon adenocarcinoma; breast cancer; pancreas adenocarcinoma; Barrett's esophagus; and other forms of neoplastic diseases of the gastrointestinal tract and the liver; and HBV infection and chronic hepatitis B.

In a preferred aspect, the disease is a chronic disease.

The FXR-mediated disease or condition is selected from the group consisting of chronic liver disease, gastrointestinal disease, renal disease, cardiovascular disease, metabolic disease and infection disease.

The chronic liver disease is selected from the group consisting of primary biliary cholangitis (PBC), cerebrotendinous xanthomatosis (CTX), primary sclerosing cholangitis (PSC), drug induced cholestasis, intrahepatic cholestasis of pregnancy, parenteral nutrition associated cholestasis (PNAC), bacterial overgrowth or sepsis associated cholestasis, autoimmune hepatitis, chronic viral hepatitis, alcoholic liver disease, nonalcoholic fatty liver disease (NAFLD), nonalcoholic steatohepatitis (NASH), alcoholic hepatitis, liver transplant associated graft versus host disease, living donor transplant liver regeneration, congenital hepatic fibrosis, choledocholithiasis, granulomatous liver disease, intra- or extrahepatic malignancy, Sjogren's syndrome, Alagille syndrome, Sarcoidosis, Wilson's disease, Gaucher's disease, hemochromatosis, biliary atresia, ductopenic liver transplant rejection, cystic fibrosis liver disease and alpha 1-antitrypsin deficiency.

The renal disease is selected from the group consisting of diabetic nephropathy, focal segmental glomerulosclerosis (FSGS), hypertensive nephrosclerosis, chronic glomerulonephritis, chronic transplant glomerulopathy, chronic interstitial nephritis, and polycystic kidney disease.

The cardiovascular disease is selected from the group consisting of atherosclerosis, arteriosclerosis, dyslipidemia, hypercholesterolemia, and hypertriglyceridemia.

The metabolic disease is selected from the group consisting of insulin resistance, Type I and Type II diabetes, and obesity.

The infection disease is selected from the group consisting of HBV infection and chronic hepatitis B. Accordingly, the subject to be treated suffers from HBV infection, for instance chronic hepatitis B.

In one particular embodiment, the disease is selected from the group consisting of NASH, NAFLD, alcoholic hepatitis, primary biliary cirrhosis or primary biliary cholangitis, primary sclerosing cholangitis (PSC), primary bile acid diarrhea, biliary atresia, gallstones, irritable bowel syndrome, hepatic steatosis, fibrotic diseases, metabolic diseases, type II diabetes, cerebrotendinous xanthomatosis, obesity, and HBV infection or chronic hepatitis B.

In one embodiment, the disease is selected from the group consisting of NASH, primary biliary cirrhosis or primary biliary cholangitis, primary sclerosing cholangitis (PSC), biliary atresia, fibrotic diseases, hepatitis B infection, chronic hepatitis B and metabolic diseases.

In a very specific embodiment, the disease is selected from the group consisting of NASH and chronic hepatitis B.

EYP001 can be administered during a period of time of at least 5, 6, 7 or 8 weeks or 1, 2, 3, 4, 5 or 6 months, for instance from 5, 6, 7 or 8 weeks to 100 weeks, in particular from 12 weeks to 80 weeks, for instance 72 weeks. Optionally, the treatment lasts from 2-4 months up to 24 months, for instance between 2 and 24 months or between 2 and 12 months, e.g., 2, 3, 4, 5, 6, 7, 8, 9, 10, 11, 12, 13, 14, 15, 16, 17, 18, 19, 20, 21, 22, 23 or 24 months.

Combined Treatment

When the disease to be treated is hepatitis B infection, especially chronic hepatitis B, EYP001 can be used in combination with an additional active ingredient, especially an immunomodulator such as an interferon or a pegylated derivative thereof.

In one aspect, the immunomodulator can be the interferon. The interferon (IFN) is preferably an IFN-a, for instance IFN-α1 or IFN-α2, e.g., IFN-α1a, IFN-α1b, IFN-α2a, IFN-α2b, IFN-α2c or consensus IFN-a. In a very particular aspect, IFN is IFN-α2a, IFN-α2b or a pegylated derivative thereof.

Optionally, IFN is selected from the non-exhaustive list consisting of consensus IFN-α (e.g., INFERGEN®, Locteron®), IFN-α1b (e.g., HAPGEN®), IFN-α2a (Roferon-A®, MOR-22, Inter 2A, Inmutag, Inferon), a pegylated IFN-α2a (e.g., PEGASYS®, YPEG-IFNα-2a, PEG-INTRON®, Pegaferon), IFN-α1b (e.g., INTRON A®, Alfarona, Bioferon, Inter 2B, citpheron, Zavinex, Ganapar, etc. . . . ), a pegylated IFN-a2b (e.g., Pegintron®, Albuferon, AOP2014/P1101, Algeron, Pai Ge Bin), and IFN-α2c (e.g. Berofor Alpha). In a particular aspect, IFN is a pegylated IFN-α2a (e.g., PEGASYS®) or a pegylated IFN-α2b (Pegintron®).

In another aspect, the immunomodulator is a TLR agonist. Preferably, the TLR agonist is a TLR7, TLR8 or TLR9 agonist. In an additional aspect, the immunomodulator is a RIG-I modulator. In another additional aspect, the immunomodulator is a STING agonist.

In a very specific embodiment, the present disclosure relates to a method for treating a subject infected by a hepatitis B virus, especially for treating a chronic hepatitis B in a patient, wherein the method comprises administering a therapeutic effective amount of EYP001; and administering a therapeutic effective amount of an immunomodulator such as IFN-α or a pegylated form thereof; wherein EYP001 is administered once a day; thereby decreasing the occurrence of pruritus.

Depending on the type of IFNα and on its pegylated form thereof, the administration regimen and the dosage are adapted and known by the skilled person.

In a particular embodiment,

EYP001 is administered at a therapeutic amount effective once per day; more specifically, at a daily dose from 25 to 800 mg per adult per day, from 50 to 800 mg per adult per day, preferably from 100 to 600 mg per adult per day, still more preferably from 150 to 400 mg per adult per day; and for instance about 300 mg per adult per day; preferably orally; and the IFNα or a pegylated form thereof is administered by subcutaneous route once a week; for instance, at a dosage varying from 1 µg to 500 µg, preferably from 10 µg to 500 µg, still more preferably from 100 µg to 250 µg, such as 100, 110, 120, 130, 140, 150, 160, 170, 180, 190 or 200 µg.

Optionally, the treatment lasts from 2-4 months up to 24 months, for instance between 2 and 24 months or between 2 and 12 months, e.g., 2, 3, 4, 5, 6, 7, 8, 9, 10, 11, 12, 13, 14, 15, 16, 17, 18, 19, 20, 21, 22, 23 or 24 months.

In this embodiment, the present disclosure relates to a pharmaceutical composition comprising EYP001 for use for the treatment a subject infected by a hepatitis B virus, especially for use for treating a chronic hepatitis B, wherein the pharmaceutical composition is used in combination with an immunomodulator such as IFNα or a pegylated form thereof and EYP001 is to be administered at a therapeutic amount effective once a day. It also relates to the use of a pharmaceutical composition comprising EYP001 for the manufacture of a medicament for use for the treatment a subject infected by a hepatitis B virus, especially for use for treating a chronic hepatitis B, wherein the pharmaceutical composition is used in combination with an immunomodulator such as IFNα or a pegylated form thereof and EYP001 is to be administered at a therapeutic amount effective once a day.

Preferably, the therapeutic amount of EYP001 to be administered is effective for decreasing the replication of HBV. By decreasing HBV replication, it is preferably meant that the HBV replication is decreased by at least 10 or 100 fold in comparison with the HBV replication in absence of EYP001. HBV replication can be assessed by determining the levels of surface HB antigen (HBsAg), HBV core (HbcAg) antigens, HbeAg, HB core related antigen (HbcrAg), HBV DNA, HBV pregenomic RNA (HBV pgRNA), pre-core RNA, relaxed circular DNA (HBV rcDNA) and/or HBV cccDNA. Accordingly, decreasing, it means that the level in at least one of HbeAg levels, HBsAg levels, HbcrAg levels, pre-genomic RNA (HBV pgRNA) levels, pre-core RNA levels, relaxed circular DNA (HBV rcDNA) levels, HBV cccDNA levels is decreased in comparison with the absence of treatment. For instance, the HBV replication can be assessed by determining the HBV DNA levels and this level is decreased by at least 10 or 100 fold in comparison with the HBV replication in absence of EYP001. Alternatively, HBV cccDNA level is decreased by at least 10, 15, 20, 25, 30, 35, 40, 45 or 50% in comparison with the absence of treatment. HBsAg loss and seroconversion are generally the goal for clinical cure.

In addition, in the context of a combined treatment with EYP001 and an immunomodulator such as IFN-α (i.e., IFN-α2a, IFN-α2b or a pegylated derivative thereof), the inventors surprisingly observed a synergistic effect on the HBV replication. The synergy is at least twice stronger when EYP001 is administered once a day in comparison with an administration twice a day with the same daily dosing.

They also surprisingly observed that EYP001 decreases the adverse effects of IFN-α, in particular the flu-like syndrome.

Further aspects and advantages of the present invention will be described in the following examples, which should be regarded as illustrative and not limiting.

EXAMPLES

HBV

Figure 1:
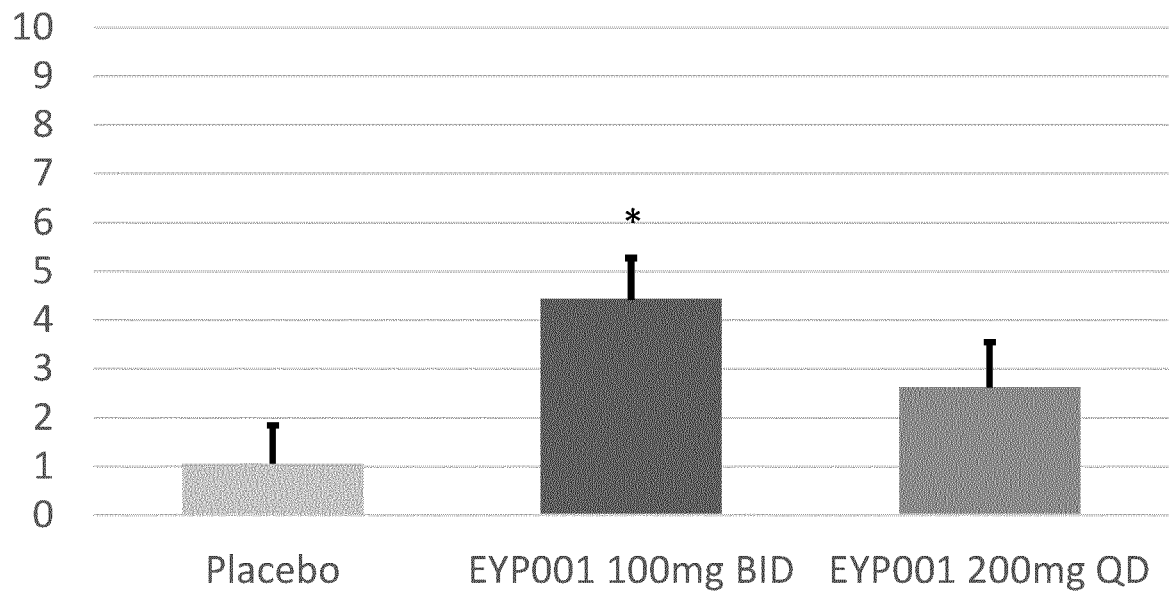
FIG. 1: Pruritus intensity reported by NASH Patients on a Visual Analog Scale (0-10); The values were integrated (AUC) over the treatment period of 12 weeks with for either EYP001 100 mg BID (n=6), EYP001 200 mg QD (n=5) or Placebo (n=7). Values are AUC least square means (error bars=SE). AUC=area under the concentration-time curve; BID=twice daily; QD=once daily. * p<0.05 versus Placebo.

Patients chronically infected with HBV underwent a 4-week treatment as either daily oral FXR agonist EYP001 monotherapy or placebo or entecavir (ETV) in Part A of the study (n=48) or in combination with IFN (Part B, n=23, weekly sub-cutaneous injections of pegylated IFNα2a, PEG-IFN). Overall 15 (30%) patients developed pruritus related to EYP001, a well-known TEAE with FXR agonist, the mechanism of which however is poorly understood. Unexpectedly and importantly, the frequency of pruritus was dependent on the regimen, both in Part A and Part B of the study: with QD dosing (once per day) compared to BID regimens (twice per day) significant differences up to four times less frequent pruritus occurred (Table 1). Patients characteristics (Tables 2 to 5) nor pharmacokinetic data (data not shown) did not explain the difference in pruritus frequency.

TABLE 1

| MedDRA Preferred Term/ MedDRA Lowest Level Term Pruritus, Itch or Pruritus Itching Pruritus, Localised itching or Pruritus generalised Itching all over OR. | EYP001a 1 × 100 mg (N = 7) QD | EYP001a 1 × 200 mg (N = 8) QD | EYP001a 1 × 400 mg (N = 9) QD | EYP001a 2 × 200 mg (N = 9) BID | EYP001a Total (N = 33) | ETV 0.5 (mg/day) (N = 7) | Placebo (N = 8) | All Subjects (N = 48) |
|---|---|---|---|---|---|---|---|---|
| n = any of above Pruritus related MEDRA | 1 (14%) | 1 (12%) | 1 (11%) | 6 (67%) | 9 (27%) | 0 (0%) | 0 (0%) | 8 (17%) |
| none of above | 6 (86%) | 7 (88%) | 8 (89%) | 3 (33%) | 24 (73%) | 7 (100%) | 8 (100%) | 40 (83%) |

| | EYP001a (1 × 300 mg) + PEG-IFN (N = 8) QD | EYP001a (2 × 150 mg) + PEG-IFN (N = 9) BID | EYP001a + PEG-IFN Total (N = 17) | Placebo + PEG-IFN (N = 8) | All Subjects (N = 25) |
|---|---|---|---|---|---|
| any of above Pruritus related MEDRA | 1 (13%) | 5 (59%) | 6 (35%) | 0 (0%) | 6 (24%) |
| none of above | 7 (87%) | 4 (44%) | 11 (65%) | 8 (100%) | 19 (76%) |

Fisher exact test showed a significant difference between QD and BID treatment groups with a p-value<0.001

TABLE 2

Summary of patient characteristics at baseline for Part A

| Parameter (units) | Statistic/ stratum | EYP001a 1 × 100 mg (N = 7) | EYP001a 1 × 200 mg (N = 8) | EYP001a 1 × 400 mg (N = 9) | EYP001a 2 × 200 mg (N = 9) |
|---|---|---|---|---|---|
| Age (Years) | Mean (SD) | 35.0 (11.9) | 40.5 (9.7) | 38.8 (8.2) | 39.9 (7.2) |
| Gender n (%) | Female | 3 (43%) | 2 (25%) | 5 (56%) | 5 (56%) |
|  | Male | 4 (57%) | 6 (75%) | 4 (44%) | 4 (44%) |
| Race n (%) | Asian | 2 (29%) | 2 (25%) | 4 (44%) | 3 (33%) |
|  | Black | — | 2 (25%) | 1 (11%) | 1 (11%) |
|  | White | 5 (71%) | 4 (50%) | 4 (44%) | 5 (56%) |
| Height (cm) | Mean (SD) | 175.4 (7.5) | 171.6 (10.4) | 168.2 (7.1) | 169.9 (9.3) |
| Weight (kg) | Mean (SD) | 73.97 (16.48) | 80.63 (14.06) | 69.54 (7.14) | 77.16 (8.40) |
| BMI ($kg/m^2$) | Mean (SD) | 23.84 (4.02) | 27.36 (4.45) | 24.63 (2.58) | 26.84 (3.42) |

| Parameter (units) | Statistic/ stratum | EYP001a Total (N = 33) | ETV 0.5 (mg/day) (N = 7) | Placebo (N = 8) | All Subjects (N = 48) |
|---|---|---|---|---|---|
| Age (Years) | Mean (SD) | 38.7 (9.0) | 45.4 (10.9) | 39.6 (12.5) | 39.8 (9.9) |
| Gender n (%) | Female | 15 (45%) | 5 (71%) | 4 (50%) | 24 (50%) |
|  | Male | 18 (55%) | 2 (29%) | 4 (50%) | 24 (50%) |
| Race n (%) | Asian | 11 (33%) | 2 (29%) | 2 (25%) | 15 (31%) |
|  | Black | 4 (12%) | 2 (29%) | 2 (25%) | 8 (17%) |
|  | White | 18 (55%) | 3 (43%) | 4 (50%) | 25 (52%) |
| Height (cm) | Mean (SD) | 171.0 (8.7) | 164.1 (6.7) | 173.3 (9.5) | 170.4 (8.8) |
| Weight (kg) | Mean (SD) | 75.25 (11.93) | 63.30 (15.92) | 72.16 (16.24) | 72.99 (13.65) |
| BMI ($kg/m^2$) | Mean (SD) | 25.73 (3.75) | 23.17 (4.13) | 23.79 (3.74) | 25.03 (3.87) |

TABLE 3

Summary of HBV infection parameters at baseline for Part A

|  | EYP001a 1 × 100 mg (N = 7) | EYP001a 1 × 200 mg (N = 8) | EYP001a 1 × 400 mg (N = 9) | EYP001a 2 × 200 mg (N = 9) |
|---|---|---|---|---|
| ALT (measn, SD) | 36.2 (20.8) | 28 (11.0) | 22.3 (6.1) | 32.4 (12.5) |
| Treatment naive | 5 (71%) | 6 (75%) | 8 (89%) | 8 (89%) |
| HBV DNA baseline mean log 10 IU/mL (SD) | 4.76 (1.15) | 3.46 (0.44) | 3.84 (0.77) | 4.35 (1.9) |
| HBsAg lgo10 IU/mL (SD) | 3.4 (0.54) | 3.5 (0.6) | 3.7 (0.6) | 3.3 (1.0) |
| HBV Genotype A | 2 (29%) | 2 (25%) | 2 (22%) | 3 (33%) |
| HBV Genotype B or C or D or E | 3 (xx %) | 5 (xx %) | 5 (%) | 3 (%) |
| HBeAg neg | 6 (86%) | 7 (88%) | 9 (100%) | 7 (78%) |

|  | EYP001a Total (N = 33) | ETV 0.5 (mg/day) (N = 7) | Placebo (N = 8) | All Subjects (N = 48) |
|---|---|---|---|---|
| ALT (measn, SD) | 29.7 (13.5) | 24.0 (10.9) | 26.3 (7.9) | 28.4 (12.4) |
| Treatment naive | 27 (82%) | 4 (57%) | 4 (50%) | 35 (73%) |
| HBV DNA baseline mean log 10 IU/mL (SD) | 4.08 (1.26) | 3.82 (0.70) | 4.02 (1.43) | 4.03 (1.20) |
| HBsAg lgo10 IU/mL (SD) | 3.5 (0.7) | 3.2 (0.6) | 3.5 (0.6) | 3.5 (0.7) |

TABLE 3-continued

Summary of HBV infection parameters at baseline for Part A

| | | | | |
|---|---|---|---|---|
| HBV Genotype A | 9 (27%) | 3 (43%) | 3 (38%) | 12 (25%) |
| HBV Genotype B or C or D or E | 16 (%) | 1 (14%) | 3 (%) | 20 (%) |
| HBeAg neg | 29 (88%) | 7 (100%) | 6 (75%) | 42 (88%) |

TABLE 4

Summary of patient characteristics at baseline for Part B

| Parameter (units) | Statistic/ stratum | EYP001a (1 × 300 mg) + PEG-IFN(18 µg) (N = 8) | EYP001a (2 × 150 mg) + PEG-IFN(18 µg) (N = 9) | EYP001a + PEG-IFN Total (N = 17) | Placebo + PEG-IFN(18 µg) (N = 8) | All Subjects (N = 25) |
|---|---|---|---|---|---|---|
| Age (Years) | Mean (SD) | 41.6 (11.0) | 38.6 (9.5) | 40.0 (10.0) | 37.9 (9.9) | 39.3 (9.8) |
| Gender n (%) | Female | 3 (38%) | 5 (56%) | 8 (47%) | 2 (25%) | 10 (40%) |
| | Male | 5 (63%) | 4 (44%) | 9 (53%) | 6 (75%) | 15 (60%) |
| Race n (%) | Asian | 2 (25%) | 3 (33%) | 5 (29%) | 2 (25%) | 7 (28%) |
| | Black | 2 (25%) | — | 2 (12%) | 1 (13%) | 3 (12%) |
| | White | 4 (50%) | 6 (67%) | 10 (59%) | 5 (63%) | 15 (60%) |
| Height (cm) | Mean (SD) | 170.0 (8.9) | 173.9 (7.7) | 172.1 (8.3) | 173.8 (9.9) | 172.6 (8.6) |
| Weight (kg) | Mean (SD) | 72.59 (11.21) | 75.84 (17.11) | 74.31 (4.29) | 76.45 (24.48) | 75.00 (17.66) |
| BMI (kg/m$^2$) | Mean (SD) | 25.04 (2.18) | 24.78 (3.89) | 24.90 (3.11) | 25.05 (6.82) | 24.95 (4.47) |

TABLE 5

Summary of HBV infection parameters Part B

| | EYP001a (1 × 300 mg) + PEG-IFN(18 µg) (N = 8) | EYP001a (2 × 150 mg) + PEG-IFN(18 µg) (N = 9) | EYP001a + PEG-IFN Total (N = 17) | Placebo + PEG-IFN(18 µg) (N = 8) | All Subjects (N = 25) |
|---|---|---|---|---|---|
| ALT (mean, SD) | 34.7 (38.6) | 27.3 (13.5) | 30.4 (26.2) | 32.2 (12.4) | 31.0 (22.6) |
| HBV DNA baseline mean log 10 IU/mL (SD) | 4.17 (1.79) | 4.26 (1.80) | 4.22 (1.74) | 4.87 (2.49) | 4.42 (1.98) |
| HBsAg lgo 10 IU/mL (SD) | 3.8 (0.6) | 3.4 (1.1) | 3.6 (0.9) | 3.9 (0.8) | 3.7 (0.9) |
| HBV Treatment naive | 5 (63%) | 8 (89%) | 13 (76%) | 3 (38%) | 16 (64%) |
| HBV Genotype A | 3 (38%) | 1 (11%) | 4 (24%) | 4 (50%) | 8 (32%) |
| HBV Genotype B | 1 (13%) | — | 1 (6%) | 2 (25%) | 3 (12%) |
| HBV Genotype C | 1 (13%) | 2 (22%) | 3 (18%) | — | 3 (12%) |
| HBV Genotype D | — | 1 (11%) | 1 (6%) | 1 (13%) | 2 (8%) |
| HBV Genotype E | 1 (13%) | — | 1 (6%) | — | 1 (4%) |
| HBeAg neg | 7 (88%) | 7 (78%) | 14 (82%) | 5 (63%) | 19 (76%) |
| HBeAg pos | — | 1 (11%) | 1 (6%) | 1 (13%) | 2 (8%) |
| anti-HBeAg pos | 7 (88%) | 7 (78%) | 14 (82%) | 5 (63%) | 19 (76%) |

Figure 3:
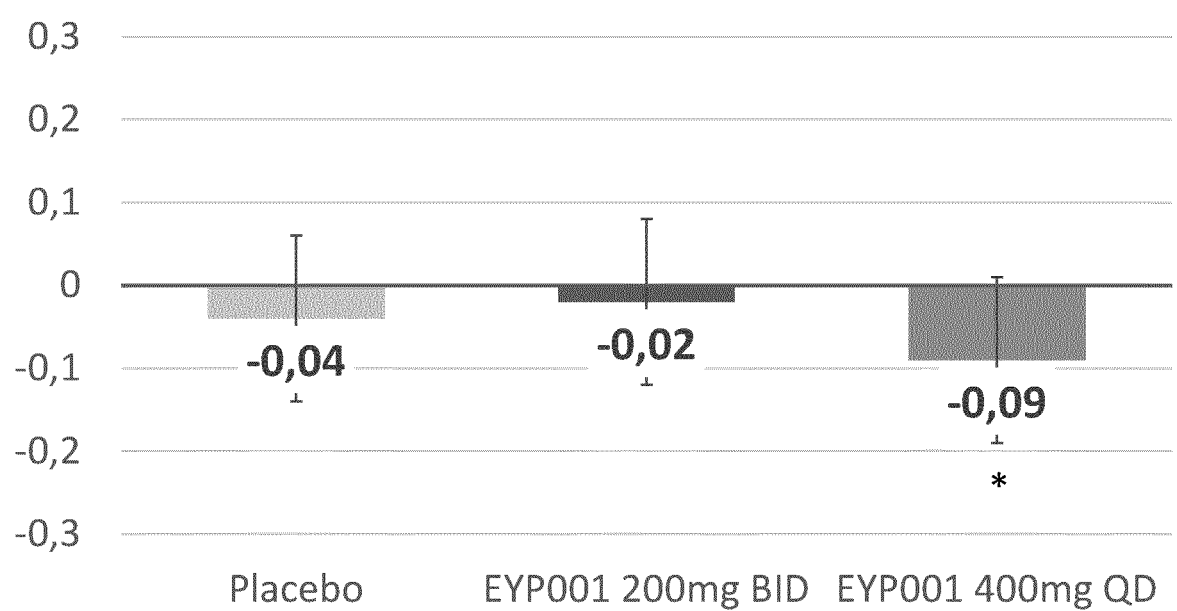
FIG. 3: Plasma HBsAg (Log 10 IU/mL) change from baseline in patients with chronic Hepatitis B infection. Patients received during 4 weeks either Placebo (n=8), EYP001 200 mg BID (n=8) or EYP001 400 mg QD (n=8). Values expressed as mean; error bar is SD. * p<0.05 vs baseline.

As shown in FIG. 3 on plasma HBsAg, a dose once a day (400 mg QD) has a better efficacy than the same daily dose provided in two administrations (200 mg BID).

NASH:

Nonalcoholic steatohepatitis (NASH) is the most common chronic liver disorder in western countries and involves steatosis, defined as liver fat content (LFC) >5%, leading to inflammation with hepatocyte injury. It is estimated that more than 5% of the population has advanced NASH. Its main consequence is liver fibrosis, which can progress to cirrhosis and hepatocellular carcinoma. Currently no registered drug therapy exists for this disease.

EYP001a is an investigational agonist of the FXR, a key regulator of bile, lipid, and glucose metabolism. In a NASH rodent model, the EYP001 reduced liver steatosis, inflammation, apoptosis, and fibrosis. Study EYP001-202 is a Phase 2a, 2-part study conducted to determine the efficacy and safety profiles of different doses and dosing regimens of EYP001 (100 mg twice daily [BID] and 200 mg once daily [QD]) versus placebo on LFC (liver fat content) from baseline to Week 12 in patients with NASH. An interim analysis on 24 patients enrolled in Part A Safety Run-in Cohort focused on safety, tolerance and key efficacy results.

Patient characteristics were typical for a NASH population and were similar across both the EYP001 and placebo groups: the mean age ranged from 48.7 years in the placebo group to 59.8 years in the 100 mg BID EYP001 group. Most subjects were female (16 of 24, 66.7%) and 23 of the 24 subjects were white (95.8%). Approximately half (54.2%) of subjects were taking statins and 58.3% had Type 2 diabetes mellitus (T2DM). Mean LFC ranged from 14.07% in the 100 mg BID EYP001 group to 22.77% in the placebo group.

VAS (Visual Analog Score) results were the followings: 100 mg BID group (mean change from baseline ranged from 3.34 on Day 7 to 6.84 on Day 21), and the 200 mg QD group (mean change from baseline ranged from 3.03 on Day 28 to 3.47 on Day 56). The VAS analysis showed better tolerance in the 200 mg QD EYP001a dose (FIG. 1).

Figure 2:
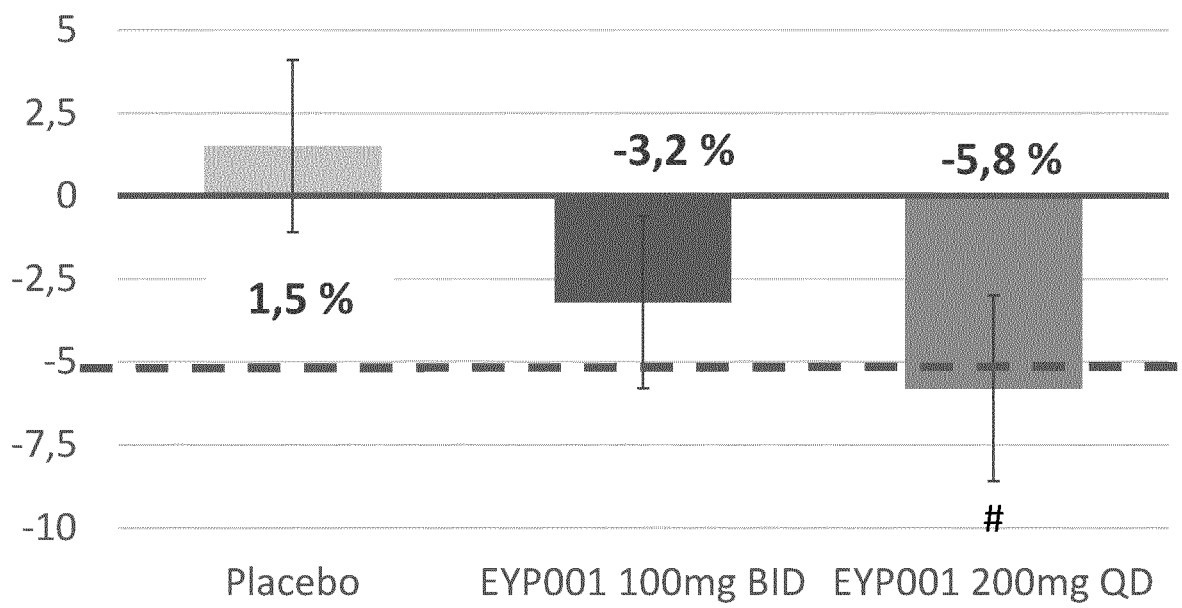
FIG. 2: Absolute Liver Fat Content Change (%) from baseline assessed by MRI-PDFF in NASH patients treated during 12 weeks with EYP001 100 mg BID (n=4) or EYP001 200 mg QD (n=3) or Placebo (n=5). Values expressed as means; error bar is SE. #p=0.07 vs baseline. The ------- line corresponds to a 5% clinical meaningful reduction. Analysis of covariance (ANCOVA) model with change from baseline as the dependent variable and baseline Liver Fat Content as a covariate and treatment (pooled EYP001 and Placebo BID) and stratification factors—statin use and T2DM status at screening as factors.

The primary efficacy endpoint of LFC reduction was met. EYP001 showed significant and clinically meaningful LFC reduction, statistically significantly lower in the EYP001 groups pooled compared with the placebo group; the difference from placebo was 8.62 (p=0.04). In addition, the 200 mg QD group showed a more pronounced effect compared to the 100 mg BID group (FIG. 2).

Overall EYP001 was safe in male and female F2-F3 NASH patients with no serious AEs. The efficacy was shown with a significant, clinically relevant LFC reduction from baseline. However, tolerance was affected due to pruritus events causing premature terminations. The BID regimen less well tolerated compared to QD regimen. In addition, a higher efficacy is associated to the QD regimen in comparison to the BID.

The invention claimed is:

1. A method of treating a disease in a patient comprising the administration of EYP001 to said patient, wherein the disease is selected from the group consisting of primary biliary cholangitis (PBC), cerebrotendinous xanthomatosis (CTX), primary sclerosing cholangitis (PSC), drug induced cholestasis, intrahepatic cholestasis of pregnancy, parenteral nutrition associated cholestasis (PNAC), bacterial overgrowth or sepsis associated cholestasis, autoimmune hepatitis, chronic viral hepatitis, alcoholic liver disease, nonalcoholic fatty liver disease (NAFLD), nonalcoholic steatohepatitis (NASH), alcoholic hepatitis, liver transplant associated graft versus host disease, living donor transplant liver regeneration, congenital hepatic fibrosis, choledocholithiasis, granulomatous liver disease, intra- or extrahepatic malignancy, Sarcoidosis, Wilson's disease, Gaucher's disease, hemochromatosis, biliary atresia, ductopenic liver transplant rejection, cystic fibrosis liver disease, alpha 1-antitrypsin deficiency, atherosclerosis, arteriosclerosis, dyslipidemia, hypercholesterolemia, hypertriglyceridemia, insulin resistance, hepatitis B virus (HBV) infection and chronic hepatitis B and wherein EYP001 is administered once a day at a dose in the range of 25 to 800 mg per day for at least 3 weeks.

2. The method according to claim 1, wherein the treatment regimen has a period in which EYP001 is administered once a day and, when pruritus occurs, the EYP001 administration is stopped for 1 to 7 days.

3. The method according to claim 1, wherein the disease is hepatitis B infection or chronic hepatitis B infection.

4. The method according to claim 3, wherein EYP001 is administered in combination with an immunomodulator.

5. The method according to claim 4, wherein the immunomodulator is selected from the group consisting of a TLR7, TLR8 or TLR9 agonist, a RIG-I modulator and a STING agonist.

6. The method according to claim 4, wherein the immunomodulator is an interferon or a pegylated form thereof, IFN-α or a pegylated form thereof, IFN-α2a or a pegylated form thereof, IFN-α2b or a pegylated form thereof.

7. The method according to claim 1, wherein the disease is nonalcoholic steatohepatitis (NASH).

8. The method according to claim 1, wherein EYP001 is administered once a day at a dose in the range of 25 to 600 mg per day.

9. The method according to claim 1, wherein EYP001 is administered for a period of time of at least 5, 6, 7 or 8 weeks.

10. The method according to claim 1, wherein EYP001 is administered once a day at a dose in the range of 100 to 400 mg per day.

11. The method according to claim 1, wherein EYP001 is administered once a day at a dose in the range of 200 to 400 mg per day.

12. The method according to claim 1, wherein EYP001 is administered for a period of 1, 2, 3, 4, 5 or 6 months.

13. The method according to claim 1, wherein EYP001 is administered for a period of 5 weeks to 100 weeks.

* * * * *